United States Patent [19]
Yost

[11] 4,172,179
[45] Oct. 23, 1979

[54] FLAME RETARDANT PLASTIC LAMINATE

[75] Inventor: James M. Yost, Sewickley, Pa.

[73] Assignee: Allegheny Plastics, Inc., Coraopolis, Pa.

[21] Appl. No.: 906,052

[22] Filed: May 15, 1978

[51] Int. Cl.² .................................................. B32B 27/32
[52] U.S. Cl. .................................... 428/516; 428/215; 428/921
[58] Field of Search ............... 428/516, 920, 921, 215, 428/214, 213

[56] References Cited

U.S. PATENT DOCUMENTS

| | | | |
|---|---|---|---|
| 3,110,611 | 11/1963 | Powelson | 428/516 |
| 3,201,302 | 8/1965 | William, Jr. et al. | 428/516 |
| 3,630,819 | 12/1971 | Conger | 428/920 |
| 3,686,067 | 8/1972 | Williams | 428/322 |
| 3,874,987 | 1/1975 | Young | 428/315 |
| 3,900,625 | 8/1975 | Chen | 428/516 |
| 3,940,549 | 2/1976 | Whittum | 428/921 |
| 4,126,262 | 11/1978 | Thompson et al. | 428/516 |

*Primary Examiner*—William J. Van Balen
*Attorney, Agent, or Firm*—Webb, Burden, Robinson & Webb

[57] ABSTRACT

A flame retardant laminate of plastic material, such as polypropylene, comprises a core of non-flame retardant plastic material, initially in the form of sheet or pellets of resin, and a thin layer or cladding of compatible flame retardant plastic material bonded to the core, the layer or cladding providing essential flame retardancy and the core providing structural bulk at substantially lower cost than the cladding. The laminate is particularly useful for panels for fabrication of plastic process equipment, such as that used in chemical plants and steel mills, which is exposed to chemical attack.

6 Claims, 1 Drawing Figure

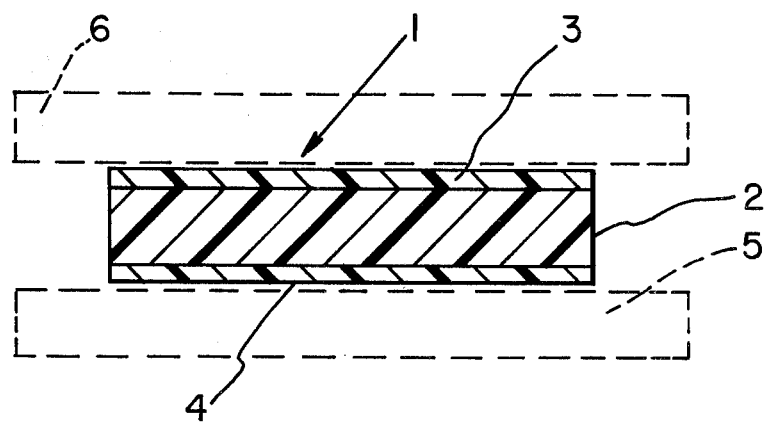

FLAME RETARDANT PLASTIC LAMINATE

FIELD OF THE INVENTION

This invention relates to plastic laminates used in the fabrication of process equipment, such as that used in chemical plants and steel mills, and particularly to laminates having flame retardant characteristics. As used herein, "flame retardant" plastic materials are materials which meet Underwriters Laboratories specifications for that classification and are distinguishable thereby from "regular" or "non-flame retardant" plastic materials.

BACKGROUND OF THE INVENTION

Plastic process equipment used in chemical plants and steel mills, such as pickle tank covers, pickle and other end use tanks, duct work, fume hoods, etc., generally is fabricated from materials, such as polypropylene plastic, which have good resistance to chemical attack and which are relatively inexpensive. However, in many such applications, the relatively high combustibility of regular or non-flame retardant polypropylene is a significant drawback.

To reduce the chance of combustion, it is possible to fabricate plastic process equipment completely of flame retardant plastic materials, such as polypropylene materials. On the other hand, such flame retardant materials are far more expensive than regular or non-flame retardant plastic materials and, in addition, flame-retardant materials are far more difficult to weld than non-flame retardant materials.

SUMMARY OF THE INVENTION

To obtain the benefit of flame retardancy without suffering the disadvantages associated with flame retardant plastic materials, the present invention is a laminate comprising a core of a non-flame retardant plastic material initially in the form of sheet or pellets of resin and a thin layer or cladding of compatible flame retardant plastic material bonded to the core, the layer of cladding providing essential flame retardancy and the core providing structural bulk at substantially lower cost than the cladding.

Based upon test results, the laminate construction that I propose greatly reduces the risk of accidental ignition of the plastic construction, e.g. as from a welding torch, and retains the chemical resistant properties of the plastic material at reasonable cost.

BRIEF DESCRIPTION OF THE DRAWING

A cross-sectional view of the laminate according to the invention is shown in the single FIGURE of the drawing.

DETAILED DESCRIPTION OF PRESENTLY PREFERRED EMBODIMENTS OF THE INVENTION

Referring to the FIGURE, a flame-retardant laminate 1 according to the invention comprises a core section 2 and at least one facing or cladding section 3 applied to a surface of the core by bonding, etc. A second facing or cladding section 4 may be applied to the opposite surface of the core. In a presently preferred embodiment of the invention, the core section 2 may be approximately $\frac{1}{8}"$ to $1\frac{1}{2}"$ and each cladding section may be approximately 1/16" thick. Preferably, sheets are used for the core section up to and including thicknesses of $\frac{3}{8}"$ and the cladding section or sections bonded thereto. Where a core section of greater than $3/8"\frac{3}{8}"$ is required, the cladding sections are bonded to a core made of resin pellets in a molding operation.

The flame retardant laminate may be made in the following manner. A 1/16" thick cladding section 4 of flame retardant plastic material, such as polypropylene, is laid on a conventional steel press plate 5 (shown in dotted lines). A plastic core section 2, for example regular or non-flame retardant polypropylene material approximately $\frac{3}{8}"$ thick, is laid on top of the cladding section 4. A second 1/16" thick cladding section 3 of flame retardant material, e.g. polypropylene material, is laid on top of the core section 2 and a second conventional steel press plate 6 is laid on top of the cladding section 3. Suitable regular polypropylene is available under the registered trademark "Moplen" (of Montecatini) from Novamont Corporation, under the registered trademark "PRO-FAX" from Hercules Incorporated, or from other suppliers. A suitable flame retardant polypropylene material is Hercules Flame Retardant Polypropylene #595.

A number of such "packs" comprising a core section, two cladding sections and two conventional steel press plates may be formed at one time for subsequent bonding using conventional pressing techniques.

In the pressing or bonding operation each pack is placed between two platens on a standard hydraulic press and subjected to a pressure of between about 100 and 110 psi. Pressing is done while the platens are heated to approximately 350° F. by passing steam through the platens. The time at temperature is approximately 30 minutes. Subsequently, the platens are cooled by passing cold water through them and the laminate is removed.

In molding a $\frac{1}{2}"$ or $\frac{3}{4}"$ thick laminate using polypropylene resin pellets for the core section, the pellets and cladding sections are heated to about 380° to 400° F. and a pressure of between about 90 and 120 psi is applied. Such pellets are commercially available from Amoco and Hercules Incorporated.

The flame retardant laminate may be formed during the stress relief cycle to which the regular plastic material, i.e. polypropylene, is subjected or it may be formed by roll lamination in which the cladding section or sections are applied to and bonded to the core section by heat and pressure.

EXAMPLES

Tests of panels of flame retardant laminates in accordance with the invention and panels made of regular or non-flame retardant plastic confirm the superiority of the present invention.

SAMPLE I

A 12"×12" panel of a laminate consisting of a regular polypropylene core section having a flame retardant polypropylene cladding section (of Hercules Flame Retardant Polypropylene #595) bonded thereto was placed approximately two feet below a welding table where welding sparks fell onto the cladding section. It was observed that there was no combustion or damage to the panel. Following the test, the sparks were brushed off the panel. Later, the distance between the welding area and the laminate was reduced to 6" and there was still no effect upon the panel.

SAMPLE II

A regular or non-flame retardant 12"×12" panel of polypropylene material was placed approximately two feet below a welding table. Sparks from the welding operation ignited the panel and it burned readily.

SAMPLE III, IV, V

Panels of the material identified below were placed under a cover of a pickle tank on an operating line of a major steel mill:

Sample III—Regular or non-flame retardant polypropylene material.
Sample IV—Furan - Fiberglass material.
Sample V—Polyester - Fiberglass material.

Following thirteen months of exposure to acid fumes, the panels were inspected and were observed to be in the condition noted:

Sample III—Somewhat discolored, otherwise satisfactory.
Sample IV—Disintegrating.
Sample V—Disintegrating.

The foregoing tests demonstrate that a panel made in accordance with the invention greatly reduces the possibility of accidental ignition, for instance from a welding torch, retains the substantial resistance to chemical attack of non-flame retardant polypropylene, especially attack by corrosive materials such as hydrochloric acid, and conventional welding techniques may be used since the weldment may be made with the regular polypropylene core section.

In a modification of the invention, the exposed edges of the regular polypropylene material used in the core section may be made flame retardant by covering them with flame retardant powder material. One technique for applying the powder is by spraying, although others will occur to those skilled in the art.

Having described presently preferred embodiments of the invention, it is to be understood that it may be otherwise embodied within the scope of the appended claims.

I claim:

1. A flame retardant laminate of corrosion-resistant plastic material suitable for making panels and the like which are exposed to chemical attack and which are adapted to be welded to one another, said laminate comprising:
   A. a core section of non-flame retardant polypropylene; and
   B. at least one cladding section in the form of a sheet bonded to said core section under heat and pressure, said cladding section being flame retardant polypropylene.

2. A flame retardant laminate as set forth in claim 1 including a core section in the form of a sheet and two cladding sections of flame retardant polypropylene, one cladding section bonded to a surface of the core section and the other cladding section bonded to the other surface of said core section.

3. A flame retardant laminate as set forth in claim 2 in which the bonding is done at a temperature of about 350° F. at a pressure of between about 100 and 110 psi.

4. A flame retardant laminate as set forth in claim 1 wherein exposed edges of the core section are made flame retardant by applying to said edges a powder of flame retardant material.

5. A flame retardant laminate as set forth in claim 1 including a core section, initially in the form of resin pellets, and two cladding sections of flame retardant polypropylene.

6. A flame retardant laminate as set forth in claim 5 in which the bonding is done at a temperature of between about 380° and 390° F. at a pressure of between about 90 and 120 psi.